United States Patent [19]

Hirosawa et al.

[11] Patent Number: 5,751,575
[45] Date of Patent: May 12, 1998

[54] METHOD AND APPARATUS FOR AIDING CONFIGURATION MANAGEMENT OF A COMPUTER SYSTEM

[75] Inventors: Toshio Hirosawa, Machida; Tsutomu Ito, Tsukui-Gun; Motohide Kokunishi; Atsushi Ueoka, both of Hachioji; Seiji Inoue, Hadano; Yoshio Ukai, Yokohama, all of Japan

[73] Assignee: Hitachi, Ltd., Tokyo, Japan

[21] Appl. No.: 504,665

[22] Filed: Jul. 20, 1995

[30] Foreign Application Priority Data

Jul. 22, 1994 [JP] Japan .................................. 6-171153

[51] Int. Cl.⁶ .................................................. G05B 9/02
[52] U.S. Cl. ........................ 364/188; 364/188; 364/405; 364/145; 364/140; 395/159; 395/712; 395/651; 395/652; 395/653; 395/677; 395/200.1; 395/200.11
[58] Field of Search ............................ 364/188, 405, 364/146, 140; 395/159, 712, 651, 652, 653, 677, 200.1, 200.11; 382/14; 206/334

[56] References Cited

U.S. PATENT DOCUMENTS

| | | | |
|---|---|---|---|
| 4,570,217 | 2/1986 | Allen et al. | 364/188 |
| 4,830,182 | 5/1989 | Nakazato et al. | 206/334 |
| 5,353,399 | 10/1994 | Kuwamoto et al. | 395/159 |
| 5,392,208 | 2/1995 | Takita et al. | 364/188 |
| 5,495,283 | 2/1996 | Cowe | 348/9 |
| 5,515,267 | 5/1996 | Alsenz | 364/188 |
| 5,586,254 | 12/1996 | Kondo et al. | 395/200.1 |

*Primary Examiner*—Reba I. Elmore
*Assistant Examiner*—McDieunel Marc
*Attorney, Agent, or Firm*—Antonelli, Terry, Stout, & Kraus, LLP

[57] ABSTRACT

In response to a variety of commands entered via a terminal unit, a configuration-management aiding apparatus directly connected to a computer system carries out various kinds of work such as laying-out of pieces of equipment, inspection of the layout of the pieces of equipment for an overlap, inspection of amounts of dissipated heat, inspection of amounts of consumed electrical power, inspection of connection of cables, creation of a cabling work specification manual, creation of a logical-configuration drawing and creation of configuration defining parameters. The configuration defining parameters are transferred to a file in the computer system. The terminal unit of the configuration-management aiding apparatus also functions as a console of the computer system.

44 Claims, 17 Drawing Sheets

FIG. 2

|   | COMMAND NAME | FUNCTION | REMARK |
|---|---|---|---|
| 1 | SET-DEV | EQUIPMENT LAYOUT | |
| 2 | CHK-AC | CALCULATION AND INSPECTION OF AMOUNTS OF DISSIPATED HEAT | |
| 3 | CHK-PWR | CALCULATION AND INSPECTION OF AMOUNTS OF CONSUMED ELECTRICAL POWER | |
| 4 | SET-CBL | CONNECTION OF CHANNEL CABLES | |
| 5 | SET-PCBL | CONNECTION OF POWER-SUPPLY CABLES | |
| 6 | GEN-TBL | CREATION OF A WORK SPECIFICATION MANUAL | FILE, LIST OUTPUT |
| 7 | GEN-CNF | CREATION OF A LOGICAL-CONFIGURATION DRAWING AND CONFIGRATION DEFINING PARAMETERS | |
| 8 | EDT | FILE-CONTENT EDITING | |
| 9 | TRS | TRANSFERRING OF CONFIGURATION DEFINING PARAMETERS TO A COMPUTER SYSTEM | |

FIG. 10

| FLOOR | CAPACITY (KW) | DEVICE | USAGE | TOTAL |
|---|---|---|---|---|
| * FL1 | 400 | CPU1 | 70 | 480 |
| | | DISC1 | 90 | |
| | | DISC2 | 80 | |
| | | MT1 | 40 | |
| | | . | | |
| | | . | | |
| | | FD1 | 3 | |
| | | LP1 | 10 | |
| FL2 | 200 | CPU2 | 55 | 135 |
| | | DISC4 | 80 | |

| FLOOR | POWER CAP. (A) | | | TOTAL USAGE (A) | |
|---|---|---|---|---|---|
| | 200V | 100V | | 200V | 100V |
| * FL1 | 1300 | 200 | CPU1 | 1800 | 30 |
| | | | DISC1 | 350 | |
| | | | DISC2 | 450 | |
| | | | MT1 | 400 | |
| | | | . | 200 | |
| | | | . | | |
| | | | FD1 | | 30 |
| | | | LP1 | 50 | |
| * FL2 | 1000 | 100 | CPU2 | 675 | 0 |
| | | | DISC4 | 275 | |
| | | | | 400 | |

POWER-SUPPLY CONTROL BLOCK (BK-T)
54

| BREAKER NAME | CONNECTED-EQUIPMENT NAME |
|---|---|
| POWER-SUPPLY VOLTAGE | BREAKING CURRENT |
| POWER-SUPPLY CABLE LENGTH ||
|  |  |
|  |  |

FIG. 15

55 CHANNEL-CABLING INSTRUCTION TABLE (CH-CBL)

| # | NAME | SLOT | FROM | TO | LENGTH | TYPE |
|---|------|------|------|------|--------|---------|
| 1 | CPU1 | 0 | CH0 | CD1 | 10 | METAL |
| 2 |      | 1 | CH1 | DKC1 | 20 | OPTICAL |
| 3 |      | 2 |     |      |    |         |
| 4 |      | 3 |     |      |    |         |
| ⋮ |      |   |     |      |    |         |
| 10 |     |   | CD1 | CD2  | 3  | METAL   |
| 11 |     |   | DKC1| DKC2 | 5  | OPTICAL |
|   |      |   |     |      |    |         |

FIG. 16

56 POWER-SUPPLY CABLING INSTRUCTION TABLE (P-CBL)

| # | NAME | BREAKER | V | A | TO | LENGTH |
|---|------|---------|-----|-----|-------|--------|
| 1 | PW-CTL | BK1 | 200 | 30 | DKC1 | 40 |
|   |        | BK2 | 200 | 400 | CPU1 | 50 |
|   |        |     |     |     |      |    |
|   |        |     |     |     |      |    |
| 2 | PW-M   | CBK1 | 100 | 5  | TERM1 | 30 |
|   |        | CBK2 | 200 | 50 | LP1   | 40 |
|   |        |      |     |    |       |    |

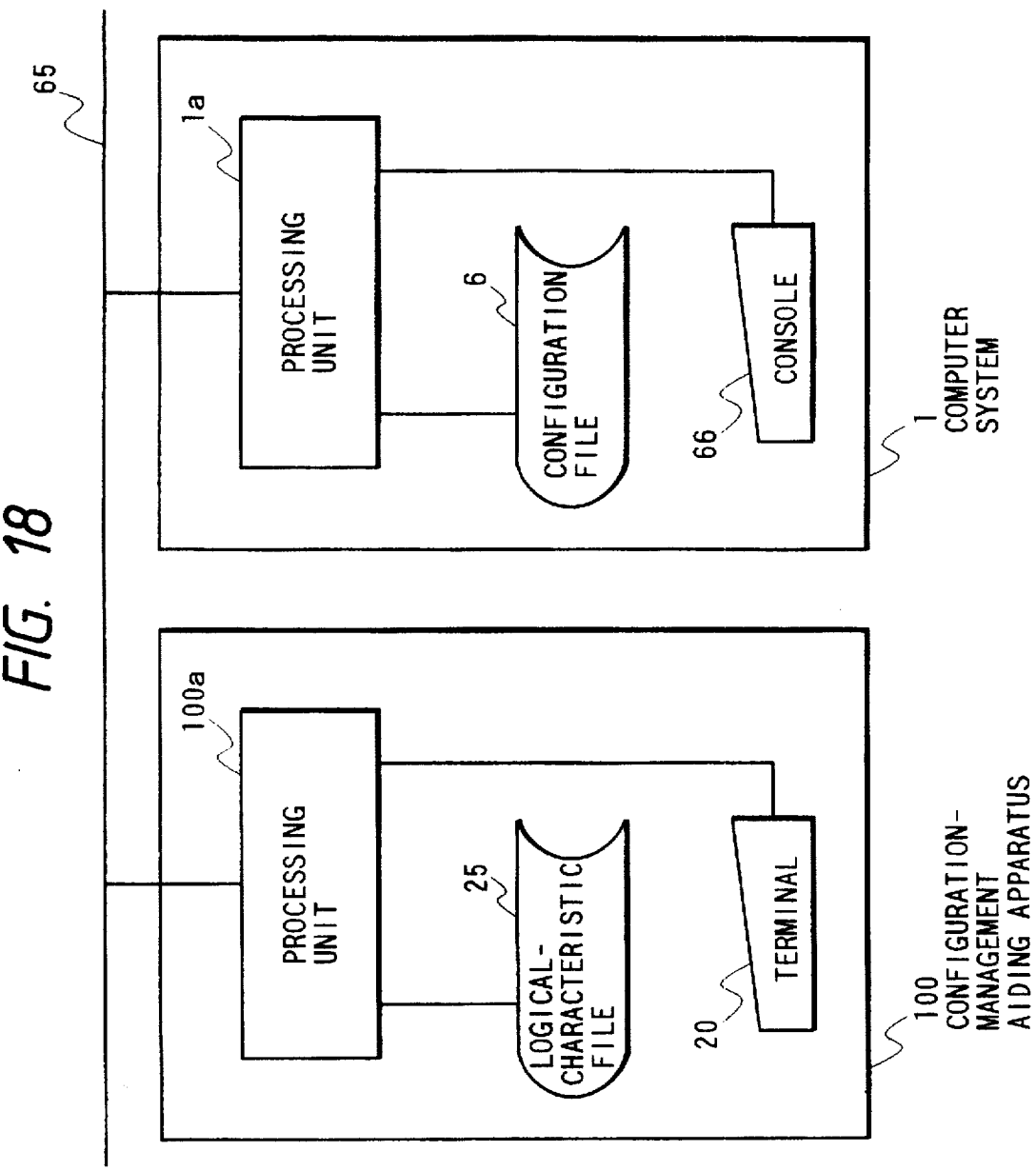

METHOD AND APPARATUS FOR AIDING CONFIGURATION MANAGEMENT OF A COMPUTER SYSTEM

BACKGROUND OF THE INVENTION

(1) Field of the Invention

The present invention relates to a method and system for aiding configuration management of a computer system, wherein designing the physical layout typically involves processing units, input/output units and other pieces of equipment composing the computer system and management also generally involves generation of configuration parameters required for an operating system of the computer system.

(2) Description of the Related Art

When installing a new computer system comprising a set of central processing units, a set of input/output units and a set of other pieces of equipment, or when it is necessary to add new equipment to or to move some equipment from an existing computer system, the following jobs need to be done.

(1) Determine a layout within an installation site.

(2) Check whether the capacities of the power supplies in the installation site are sufficient or insufficient.

(3) Check whether or not the cooling capacity of the air-conditioner in the installation site is sufficient or insufficient.

(4) Prepare a manual of how to connect cables of power supplies for each piece of equipment and carry out the cabling work.

(5) Prepare a manual of how to connect signal cables among pieces of equipment and carry out the cabling work.

(6) Determine configuration parameters required by the OS (operating system) and generate a system based on the configuration parameters.

The jobs described above are part of the work to manage the operation of the computer system and, in particular, pertain to the category of non-steady operation jobs. Normally, these jobs are the responsibility of a specialist known as a system engineer. In a large-scale batch center or on-line center, the number of pieces of equipment composing a computer system is several hundreds to several thousands and there are normally five to six resident system engineers assigned to a computer-system site.

When it is necessary to install a new computer system or to move the installation of some equipment from an already existing computer system, first of all, the system engineer in charge of the jobs determines installation locations of the equipment by trial and error using scaled-down drawings of the installation locations and the equipment prior to the creation of an equipment-layout drawing. The system engineer then checks whether the capacities of the power supplies and the cooling capacities of the air-conditioners at the installation site are sufficient or insufficient. In recent years, these jobs can be carried out by using tabular-calculation software.

In order for the people in charge of the jobs to be able to perform the connection work to connect cables between power supplies and equipment and signal cables among pieces of equipment, manuals describing connection instructions for the power-supply and signal cables must be prepared. These connection-specification manuals include equipment-layout drawings showing lines additionally drawn thereon for denoting power-supply and signal cables. Furthermore, in order to make it easy to install the equipment, manuals describing instructions for these kinds of work must also be prepared. These work-specification manuals describe instructions regarding the installation locations of the equipment, connections among pieces of equipment, the type and length of each cable and units to which cables are to be connected.

While these jobs are being done, preparation for completing the OS is needed. The preparation to complete the OS is known as system generation comprising the following processes:

(1) A process to reflect the device configuration of the computer system in the OS.

(2) A process to define optional functions of the OS and include processing programs for the optional functions in the OS.

In particular, the process (1) is referred to as I/O generation (I/O GEN) whereas the processes (1) and (2) are called the system generation (SYSGEN), a generic name for both the processes.

In the I/O generation, attributes of all pieces of equipment composing the computer system and connection/relation among the pieces of equipment need to be described clearly. For this reason, in the system generation, descriptions of parameters for defining the system configuration are created and then entered into the computer system. At the same time, drawings showing the configuration of the connection among the pieces of equipment (known as logical-connection drawings) need to be created, maintained and controlled. Theses jobs were mostly done manually in the past.

SUMMARY OF THE INVENTION

As described above, in the past, creation of an equipment layout, determination of cable connection, creation of drawings showing the cable connection, checking the capacities of power supplies and the air-conditioners and creation of logical-connection drawings to mention a few are done individually by people in charge of the jobs. The created manuals are also controlled individually by people in charge of the jobs. On top of that, only some of these jobs are done by utilizing computer software such as a tabular-calculation program while the remaining majority relies on human power.

As a result, problems listed below a re encountered.

(1) Miscommunication is likely to occur at every phase of the jobs.

(2) Detailed information on details of equipment characteristics such as types of connectable cables is limited to knowledge levels of individual people in charge of the jobs.

(3) A dedicated system engineer is required for each work unit or at each customer site.

If the above problems can be solved, big improvement of non-steady jobs to build up a computer system can be expected.

It is therefore an object of the present invention to aid, by means of a computer, various kinds of intellectual work required in installing a new computer system or partially modifying the existing computer system.

More specifically, it is an object of the present invention to automatically inspect a variety of conditions required in the determination of an equipment layout and cable connection.

It is another object of the present invention to enable the determination of an equipment layout and cable connection through an interactive process between a computer and the user.

It is further another object of the present invention to aid a variety of intellectual work required in the installation and modification of a computer system by means of a single computer serving as a uniform tool for all kinds of the intellectual work.

It is still further another object of the present invention to automatically create a variety of manuals required as aids in the determination of a layout and cable connection of pieces of equipment.

It is still further another object of the present invention to provide an aid computer for computing parameters for defining a system configuration and to allow a computer system installed in accordance with specifications determined by the support of the aid computer to directly utilize the parameters without human intervention.

It is still further another object of the present invention to allow the aid computer to be used as a console of a computer system installed in accordance with specifications defined through the support of the aid computer.

In order to achieve the objects described above, aid method for a configuration management according to the present invention comprises the following steps:

determining proper locations for installing pieces of equipment composing a computer system through use of a drawing of an installation area displayed in a display screen and interactive operations between a user and the computer system;

inspecting cables connecting the pieces of equipment after their installation locations have been determined for connection appropriateness, in response to a command issued by the user; and generating configuration defining parameters to be used by the operating system of the computer system from characteristics of the pieces of equipment after the cable connection has passed inspection.

In the process of determining the locations for installing the pieces of equipment, the computer performs the following:

displaying a drawing of an installation area, displaying figures of pieces of equipment specified by the user on an installation area on the drawing specified by the user, or moving the figure of a piece of equipment specified to be moved to another location, and checking whether or not the moved figure overlaps figures of existing pieces of equipment at other locations. The movement of equipment from an installation area to another one is accomplished by using a multi-window function. A piece of equipment overlapping another one is displayed, when such an overlap is detected. When the layout of the pieces of equipment has been determined, an apparatus attribute values table including characteristics of the pieces of equipment and an environment attribute values table including characteristics of installation areas are created.

For each installation area, the total amount of heat dissipated by the pieces of equipment is compared to the cooling capacity of the air-conditioner. If the former is found greater than the latter, a warning is displayed. In addition, the total amount of electric power consumed by the pieces of equipment is compared to the capacities of the power supplies. If the former is found greater than the latter, a warning is similarly displayed.

For pieces of equipment having their installation locations determined, channel cables and power-supply cables connecting pieces of equipment specified by the user on a display screen are displayed. As for the connection of the channel cables, the connection appropriateness is examined. Any detected improper connection is displayed. For example, the number of daisy-chained units (the number of pieces of equipment in a daisy-chain connection) is checked against the length of the cable.

After the installation locations and connection of the pieces of equipment have been determined, a logical-configuration drawing expressing logical interconnection among the pieces of equipment and configuration defining parameters for use by a system-generation program are created by using information obtained from the processes carried out so far. In addition, a manual describing work instructions for the installation work can also be created as well. The configuration defining parameters are, in some cases, transferred directly to the computer system, an object of the configuration management. Furthermore, the system-generation program of the computer system can also be invoked directly from a terminal unit of the aid computer.

In addition, according to the present invention, the aid computer and the computer serving as an object of the configuration management (referred to hereafter as a configuration-management-object computer) are connected to each other by connection equipment for transferring the configuration defining parameters, forming a compound computer. It should be noted, however, that the connection between the computers can also be implemented by a LAN (Local Area Network) as well. In addition, the connection equipment can be designed so as to also allow a command to activate the system-generation program to be transmitted from the terminal unit of the aid computer to the configuration-management-object computer. Furthermore, other commands can also be transmitted from the terminal unit to the computer serving as an object of the configuration management. On top of that, messages can be output by the configuration-management-object computer to the terminal unit. In general, the aid computer can also carry out functions of a console of the configuration-management-object computer.

According to the method provided by the present invention as described above, various kinds of intellectual work required in the installation of a new computer system or partial modification of an existing computer system can be supported by using an aid computer. More specifically, a variety of conditions required in the determination of a layout and cable connection of pieces of equipment are inspected automatically. In other words, a layout and cable connection of pieces of equipment are determined through an interactive process between the aid computer and the user. In addition, various kinds of intellectual work required in the installation or modification of a computer system is supported by a single aid computer in a uniform manner. On top of that, a variety of manuals required as aids to the determination of a layout and cable connection of pieces of equipment are generated automatically.

In addition, by virtue of the compound computer provided by the present invention, configuration defining parameters generated by the aid computer can be used directly by the computer system installed in accordance with specifications determined by the support provided by the aid computer without human intervention. In other words, the aid computer can serve as a console of the computer system installed in accordance with specifications determined by the support provided by the aid computer.

BRIEF DESCRIPTION OF THE DRAWINGS

FIG. 2 is a drawing showing a typical command set used in the present invention;

FIG. 10 is a drawing of a typical display screen showing a table of the amount of dissipated heat and the cooling capacity of the air-conditioner for each floor;

FIG. 11 is a drawing of a typical display screen showing a table of the amount of consumed electric power heat and the capacities of power supplies for each floor;

FIG. 13 is a drawing showing a set of typical power-supply control blocks for power-supply cables connected to the pieces of equipment;

FIG. 15 is a drawing showing a typical channel-cabling instruction table;

FIG. 16 is a drawing showing a typical power-supply-cabling instruction table;

FIG. 18 is a block drawing of another embodiment provided by the present invention.

DESCRIPTION OF THE PREFERRED EMBODIMENTS

Figure 1:
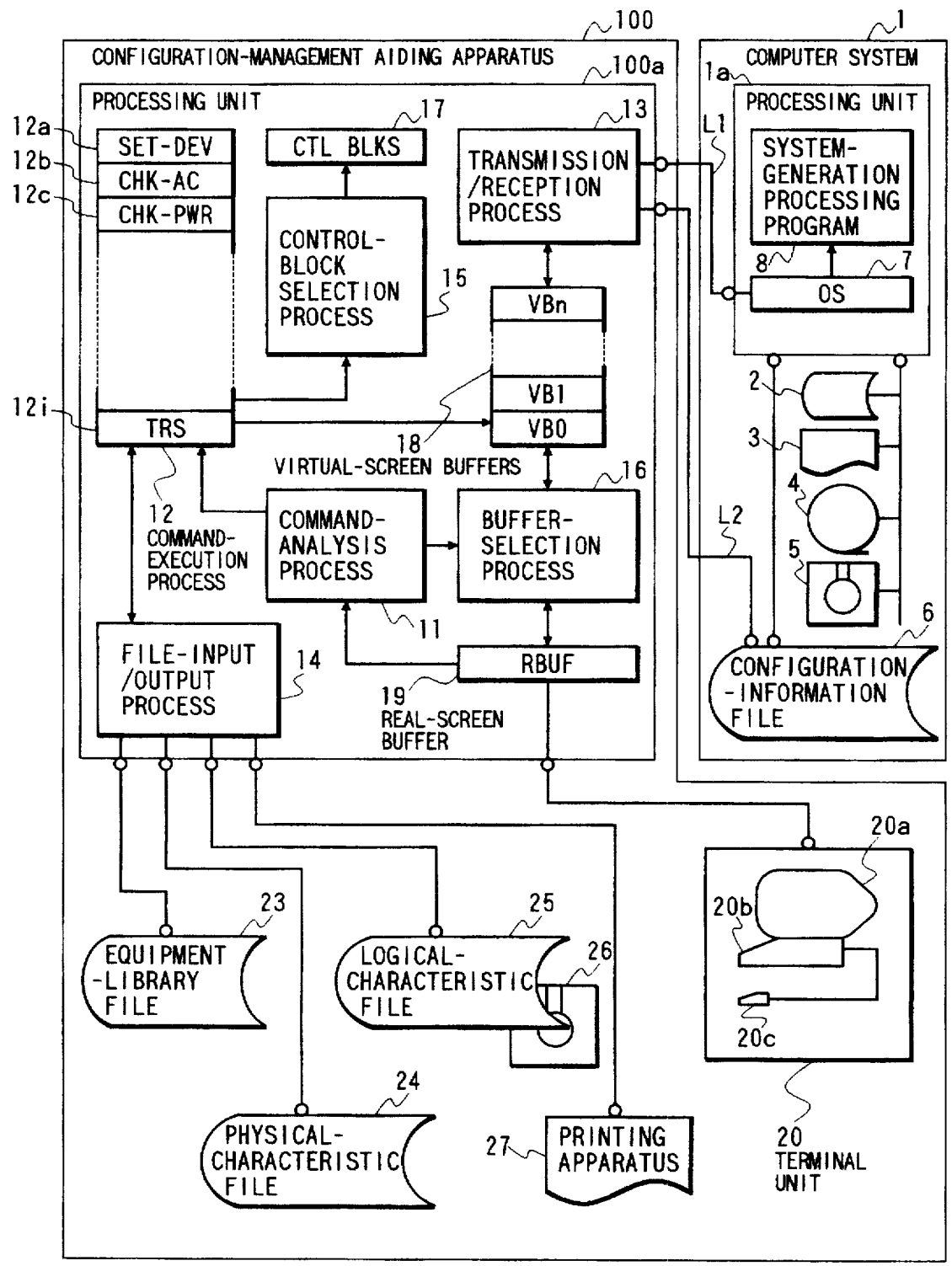
FIG. 1 is a block drawing of an embodiment provided by the present invention.

FIG. 1 shows, in a simple way, characteristics of a method for aiding configuration management of a computer system and an apparatus provided by the present invention.

A block 1 shown in the figure is a computer system whereas a block 100 is a configuration-management aiding apparatus provided by the present invention. The computer system 1 comprises a processing unit 1a which includes a CPU and a main storage device, magnetic-disc drives 2 and 6 connected to the processing unit 1a, a line-printer unit 3, a magnetic-tape drive 4 and a set of input/output units including a floppy-disc drive 5.

In particular, the magnetic-disc drive 6 is used as a configuration-information file. An OS 7 runs on the processing unit 1a whereas a system-generation processing program 8 runs under the operating system 7.

The configuration-management aiding apparatus 100 itself is a computer system which comprises a processing unit 100a including a CPU (not shown) and a main storage device (not shown), a terminal unit 20 connected to the processing unit 100a, magnetic-disc drives 23 to 25, a floppy-disc drive 26 and a printing apparatus 27. The terminal unit 20 comprises a display unit 20a, a keyboard 20b and a mouse 20c.

In particular, the magnetic-disc drive 23 is used as an equipment-library file for storing, among other pieces of information, characteristics, dimensions and shapes of a variety of equipment. The magnetic-disc drive 24 is, on the other hand, used as a physical-characteristic file for storing, among other pieces of information, the shape and dimensions of each floor, the layout of pieces of equipment and the physical connection among the pieces of equipment. The magnetic-disc drive 25 is, by the way, used as a logical-characteristic file for storing, among other pieces of data, logical connection/relation among the pieces of equipment and configuration defining parameters.

In this embodiment, these files are deliberately stored in separate magnetic-disc drives in order to make the explanation simple. It should be noted, however, that these files can also be stored in a single magnetic-disc drive. The floppy-disc drive 26 is used for outputting created configuration defining parameters to a floppy disc whenever necessary.

On the other hand, the processing unit 100a comprises a command-analysis process 11, a command-execution process 12, a transmission/reception process 13, a file-input/output process 14, a control-table-selection process 15, a buffer-selection process 16, control block 17, a set of virtual-screen buffers (VB0 to VBn) 18 and a real-screen buffer (RBUF) 19. The command-execution process 12 comprises command-execution processing sub-programs 12a to 12i for executing a plurality of commands as will be described later.

In this embodiment, the processes 11 to 16 are each implemented as a program module whereas the control blocks 17, the virtual-screen buffers (VB0 to VBn) 18 and the real screen buffer (RBUF) 19 are areas allocated to them in a main storage device of the computer system (not shown).

A command to the configuration-management aiding apparatus 100 is entered by operating keys on the keyboard 20b or by selecting a command from a command menu displayed on the screen of the display unit 20a by means of a mouse 20c. A command entered in this way is passed on to the command-analysis process 11 through the real-screen buffer 19. The command-analysis process 11 interprets the command, selecting one of the command-execution processing sub-programs 12a to 12i associated with the command. The selected sub-program is then invoked.

The configuration-management aiding apparatus 100 can be a computer system of any size as long as it has a sufficient storage capacity for accommodating the processing programs and sub-programs, the control blocks, the virtual-screen buffers and the real-screen buffer and the peripheral units described above or their equivalents. For example, a personal computer can be used as the configuration-management aiding apparatus 100.

In the embodiment shown in the figure, the configuration-management aiding apparatus 100 is connected to the computer system 1, an object of the configuration management, by cables L1 and L2.

To be more specific, the configuration-management aiding apparatus 100 can communicate with the OS 7 running on the computer system 1 through the cable L1 and can access the configuration-information file 6 of the computer system 1 through the cable L2. Only after the installation of the computer system 1, an object of the configuration management, has been completed can such communication take place or such an access be made. When it is necessary to add a new piece of equipment to an already installed computer system 1 or to move an existing piece of equipment employed by the computer system 1 to another place after the installation has been completed, configuration defining parameters created by the configuration-management aiding apparatus 100 as will be described later can be directly transferred from the configuration-management aiding apparatus 100 to the configuration-information file 6 of the computer system 1 through the cable L2.

When a new computer system 1 is to be installed, however, the connection by the cables L1 and L2 does not exist yet. In this case, configuration defining parameters are output by the floppy-disc drive 26 to a floppy disc which can later be mounted on the floppy-disc drive 5 employed in the computer system 1.

Figure 3:
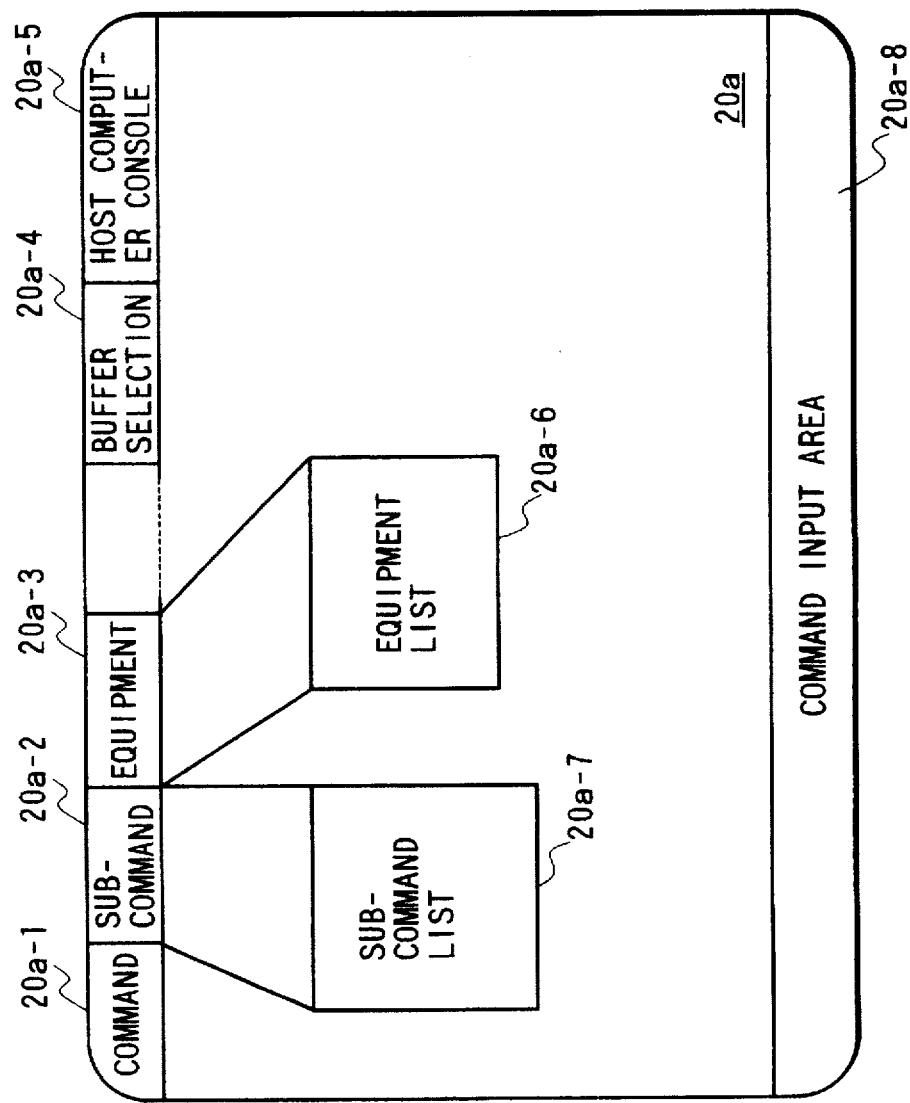
FIG. 3 is a drawing showing a typical selection-menu screen.

FIG. 2 shows a table of commands that can be executed by the command-execution process 12. FIG. 3 shows a typical command menu appearing on the screen of the display unit 20a.

As shown in FIG. 3, the command menu on the screen comprises a command specifying areas 20a-1, a sub-command specifying area 20a-2, an equipment-library specifying area 20a-3, a buffer selecting area 20a-4 and a host-console area 20a-5 as well as a command inputting area 20a-8 at the bottom of the screen. When specifying an item by means of the mouse 20c, point a desired one of the areas 20a-1 to 20a-5 by the mouse 20c and click it.

For example, the sub-command specifying area 20a-2 is clicked. In this case, a list of sub-commands 20a-7 is displayed. A desired sub-command is then selected from the list by the mouse 20c, by pointing the desired sub-command and clicking it. When specifying a desired command, put the mouse 20c on the command specifying areas 20a-1 and carry out similar operations to those for selecting a desired sub-command described above. In this way, the desired command can be specified.

When a command is entered via the keyboard 20b, a string of characters describing the entered command appear on the command inputting area 20a-8. When a command is entered in this way, the command-analysis process 11 is invoked.

Figure 4:
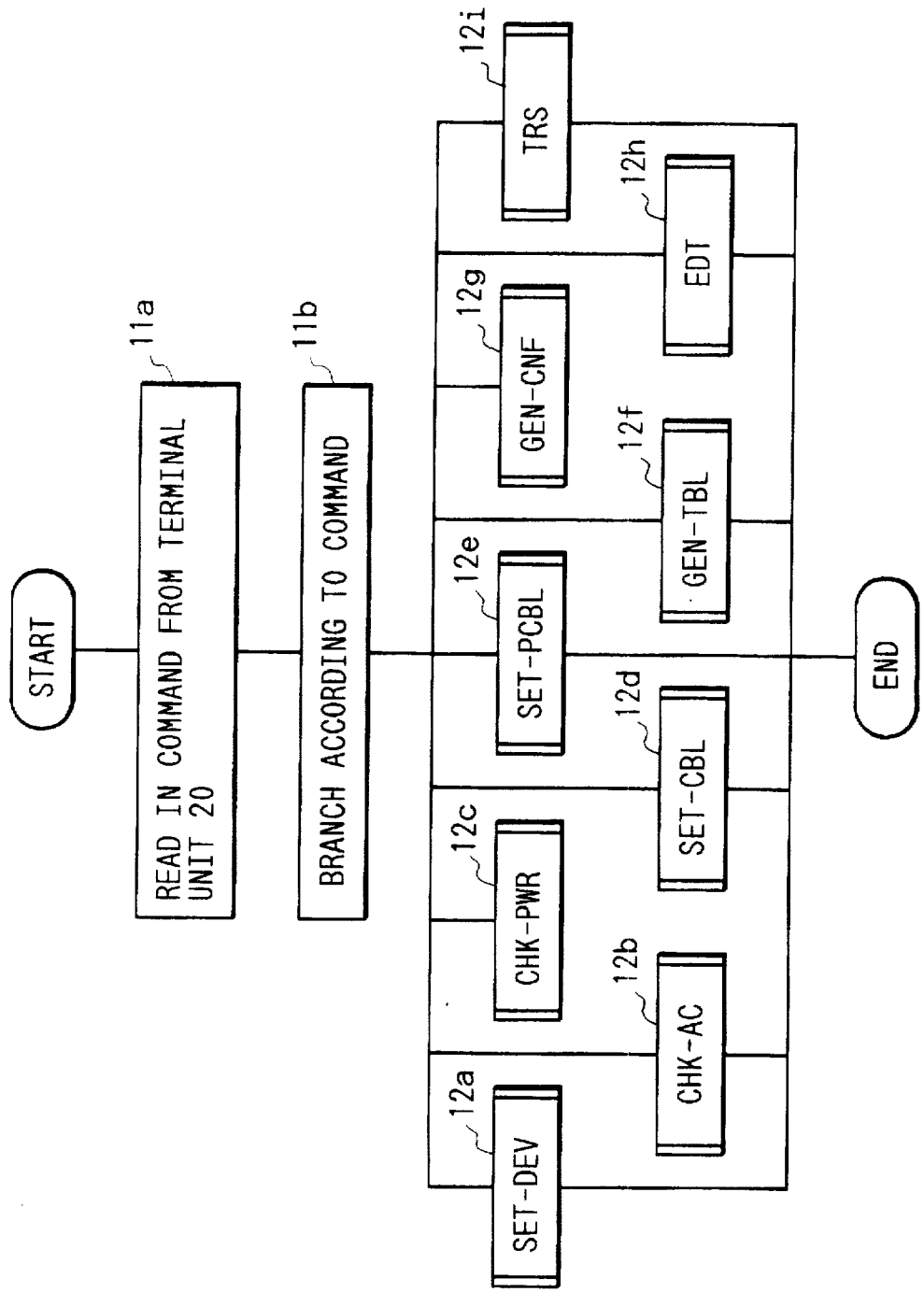
FIG. 4 shows a flowchart of processing to analyze a command.

FIG. 4 shows a processing flow of the command-analysis process 11.

At a step 11a shown in the figure, a command entered from the terminal unit 20 is fetched from the real-screen buffer 19. The flow proceeds to a next step 11b to interpret the command and then to transfer control to one of the command-execution processing sub-programs 12a to 12i which is associated with the command.

The command-execution processing sub-programs 12a to 12i execute commands 1 to 9 respectively shown in FIG. 2. During the execution of a command, the control block 17 and the virtual-screen buffers 18 are used whenever necessary. In addition, the files 23 to 25 are accessed through the file-input/output process 14.

Here, it is nice to briefly explain the contents of the files 23 to 25 before describing the processing of each command.

As described earlier, the equipment-library file 23 is used for storing information on characteristics of pieces of equipment in a broad sense such as dimensions and shapes of the pieces of equipment, the amount of dissipated heat and the amount of consumed power for each piece of equipment as well as the cooling capacity of the air-conditioner and the capacities of the power supplies at each floor. The physical-characteristic file 24 is, on the other hand, used for storing the drawing of each floor. In addition, it is also used for storing equipment-layout drawings resulting from the execution of some commands, the capacities of the power supplies and the cooling capacity of the air-conditioner for each floor, physical characteristics of pieces of equipment in the layout and information on cable connection among the pieces of equipment.

The logical-characteristic file 25 is, by the way, used for storing configuration-defining parameters and information on logical connection among the pieces of equipment generated by the GEN-CNF command.

(1) SET-DEV Command 12a

This command is issued in order to determine a layout of pieces of equipment when installing a new computer system, adding/removing equipment to/from an existing computer system or moving a piece of equipment to another location.

Figure 5:
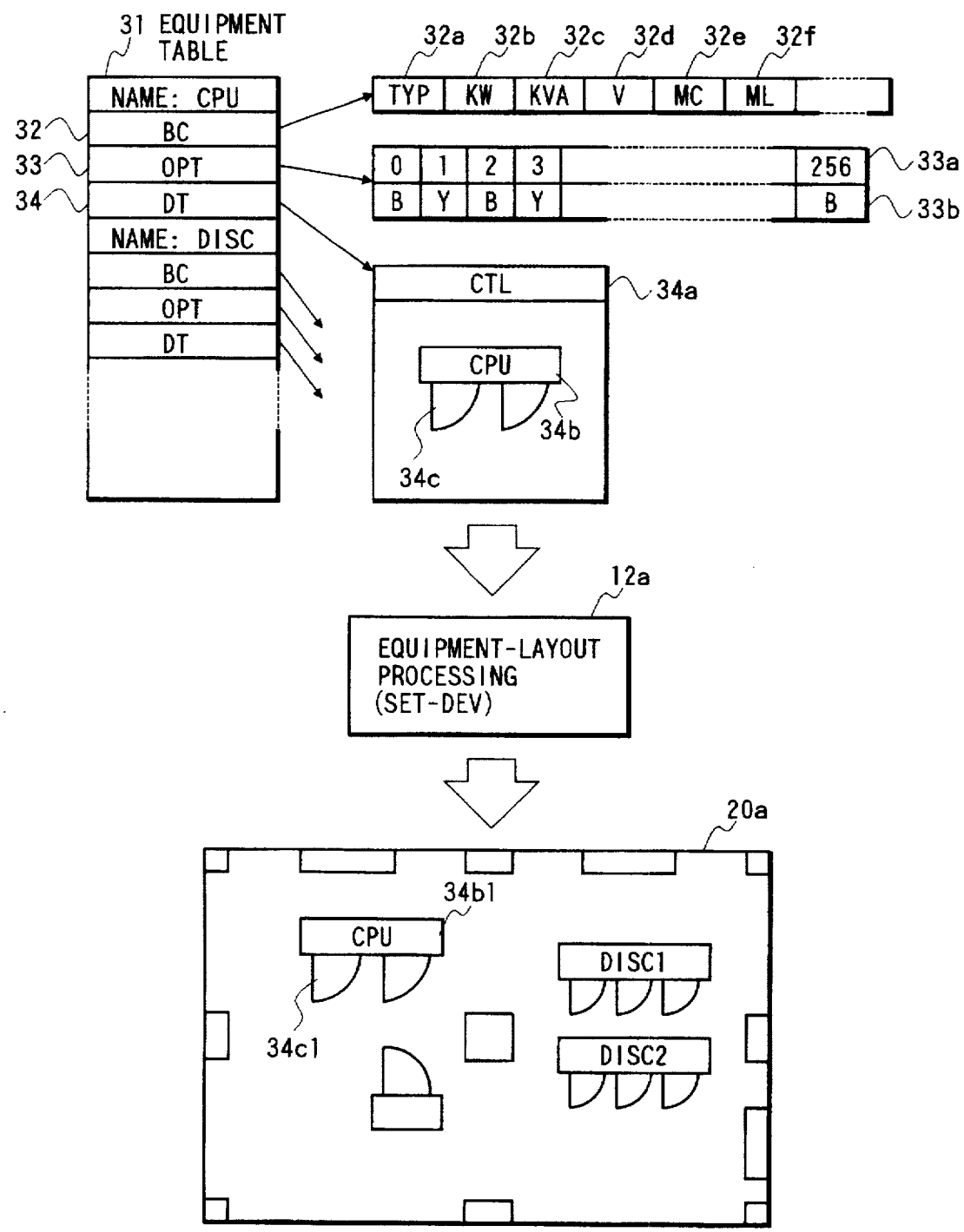
FIG. 5 is a drawing showing an outline of the processing of the SET-DEV command.

FIG. 5 is a model drawing showing an outline of a process to execute this command.

An equipment table 31 describing physical characteristics of each piece of equipment is part of the equipment-library file 23. The equipment table 31 comprises a basic-characteristic field (BC) 32, an option field (OP) 33 and a data field (DT) 34 for each piece of equipment.

The basic-characteristic field 32 includes, among other pieces of information, the type of the equipment (TYP) 32a, the amount of dissipated heat (KW) 32b, the amount of consumed electric power (KVA) 32c and the voltage in use (V) 32d.

The option field 33 includes information on options for the equipment which differs from equipment to equipment. In the case of a CPU, for example, the information includes the type 33b of each channel 33a which can be a block multiplexer channel (B) or a byte multiplexer channel (Y).

The data field 34 includes control information (CTL) 34a indicating actual dimensions (the height, the width and the depth) of the equipment and its scaled-down plane FIG. 34b which includes a figure of a space required for opening and closing a maintenance door of the equipment.

When the user puts the mouse 20c on the equipment-library specifying area 20a-3 on the display screen shown in FIG. 3 and clicks it, an equipment list 20a-6 is displayed. The user then specifies a desired piece of equipment from the list. At that time, figures and 34c of the desired equipment are displayed. The user then specifies a desired position on the plane drawing of the floor appearing on the display unit 20a by putting the mouse 20c on it. As the mouse 20c is clicked, the FIGS. 34b and 34c are copied into the desired position as shown by reference numerals 34bl and 34cl respectively.

The processing of the SET-DEV command includes the inspection of whether or not some pieces of equipment overlap each other.

The equipment-overlap inspection also takes the space 34c for opening and closing the door into consideration. Pieces of equipment are laid out in such a way that they including the spaces 34c for opening and closing the doors do not overlap each other. In this way, a space for maintenance is also reserved. In addition, in the processing of the SET-DEV command, an apparatus attribute values table showing attributes of the laid-out pieces of equipment and an environment attribute values table showing attributes of installation areas (or floors) are created.

Figure 6:
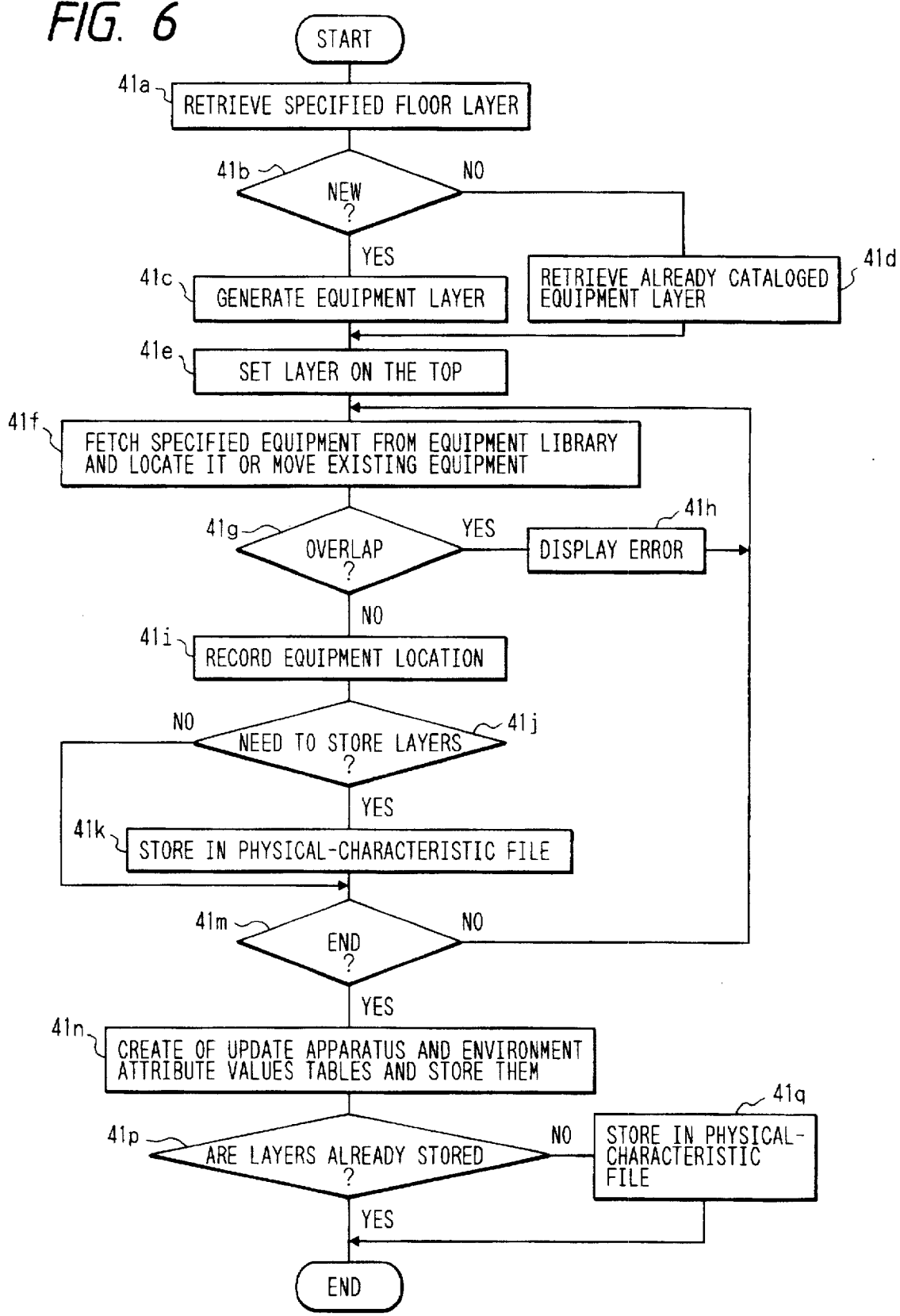
FIG. 6 shows a flowchart of the processing of the SET-DEV command.

FIG. 6 shows a processing flow of an equipment-layout processing program for executing the SET-DEV command.

At a step 41a shown in the figure, the drawing of a floor for installing equipment is retrieved from the physical-characteristic file 24 into one of the virtual-screen buffers (VB0 to VBn).

In this patent specification, a drawing processed by the command-execution process is called a layer. For example, a floor layer means the drawing of a floor.

Figure 7:
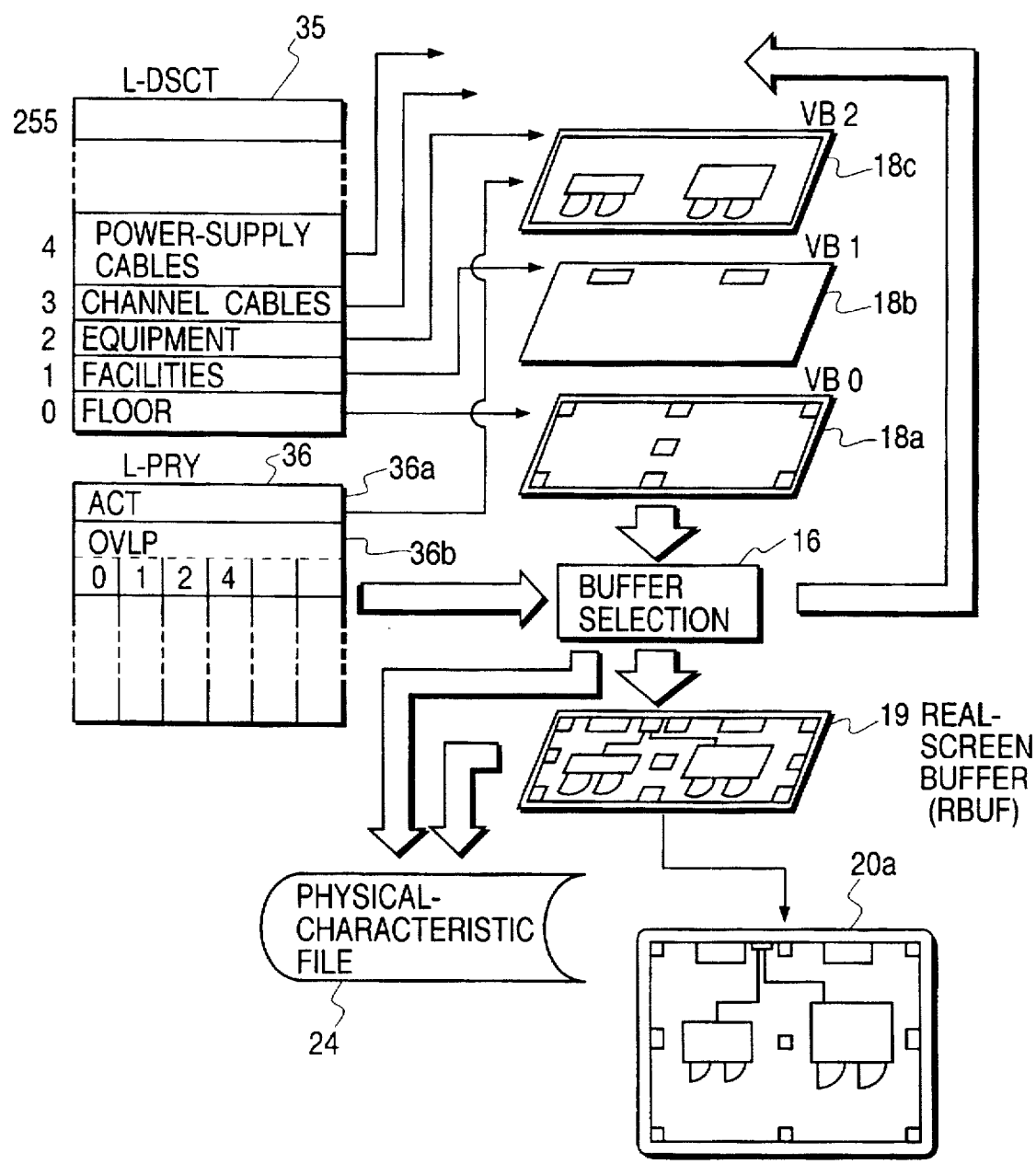
FIG. 7 is a drawing showing relations among a variety of layers.

FIG. 7 is a diagrammatic process of creating an equipment-layout layer, showing a variety of layers simultaneously.

Each layer is controlled by L-DSCT 35 and L-PRY 36, portions of the control blocks 17. The virtual-screen buffers (VB0 to VBn) are each assigned to a layer. The L-DSCT portion 35 shows the assignment of each layer to a virtual-screen buffer whereas the L-PRY portion 36 shows which layers should be shown simultaneously on the screen.

In FIG. 7, the virtual-screen buffers VB0, VB1, VB2 etc. with buffer numbers 0, 1, 2 etc. are assigned to a floor layer, a facility layer, an equipment layer etc. An ACT field 36a in the L-PRY portion 36 indicates that the equipment layer is currently being operated.

An OVLP field 36b of the L-PRY portion 36 shows that the virtual-screen buffers VB0, VB1, VB2 and VB4 should be shown on the screen, overlapping each other. As a result, the floor layer, the facility layer, the equipment layer and the power-supply cable layer overlap each other in the real-screen buffer 19 and are shown on the display unit 20a simultaneously. A new layer created by overlapping a plurality of layers as described above can be stored in an available virtual-screen layer.

Such layer management and buffer management are accomplished by the buffer-selection process 16.

After retrieving a desired floor layer at the step 41a of FIG. 6, the flow proceeds to a step 41b to examine whether or not the installation is to be carried out on a new floor. In the case of installation to be carried out on a new floor, the flow proceeds to a step 41c to generate a new equipment layer. Otherwise, the flow continues to a step 41d to retrieve a relevant cataloged equipment layer from the physical-characteristic file 24. The equipment layer obtained in this way is specified as a top layer at a step 41e. The ACT field 36a shown in FIG. 7 is set to point to this equipment layer.

Steps 41f to 41i are processings to install new pieces of equipment, move or remove existing ones.

At the step 41f, in the case of new-equipment installation, the FIGS. 34b and 34c as well as attribute values 32 and 33 of the new pieces of equipment are retrieved from the equipment library file 23. The FIGS. 34b and 34c are placed at a position on the display screen indicated by the mouse 20c. To put it in more detail, the figures of the equipment are placed at the specified locations on the equipment layer currently being operated. In the real-screen buffer 19, the equipment is superimposed on other layers to form a display screen.

Movement of a piece of equipment to another location on the same floor can be accomplished by pointing the figure of the equipment by the mouse 20c and clicking it and then specifying the other location by using the mouse 20c. Similarly, removal of a piece of equipment can be accomplished by pointing the figure of the piece of equipment by the mouse 20c and clicking it and then requesting the removal. Movement of a piece of equipment from one floor to another is accomplished by using the multi-window function. To put it in more detail, the figure of the equipment on an equipment-layout screen is first pointed by the mouse 20c prior to movement and then the mouse is clicked. Then, a desired location on an equipment-layout screen, the destination of the movement displayed on another window is specified. There, an inter-window communication mechanism works, moving the figure clicked by using the mouse to the desired location specified on the destination window.

The flow then proceeds to a step 41g to inspect if the new or moved equipment coincides with an existing piece of equipment. The inspection is carried out by examining the coordinates and dimensions of the locations of the equipment including spaces for opening and closing doors thereof.

If a result of the inspection indicates that the pieces of equipment overlap each other, the flow proceeds to a step 41h to display an error warning on the screen of the display unit 20a. The flow then returns to the step 41f. The error warning is typically an appropriate error message or accompanied by printing of the figure of the new or moved piece of equipment coinciding with an existing one. In this way, the layout design can be carried forward interactively on a trial-and-error basis until the pieces of equipment do not coincide with each other any more.

If a result of the inspection indicates that the pieces of equipment do not coincide with each other, on the other hand, the flow proceeds to a step 41i to record the coordinates of the equipment.

At steps 41j and 41k, equipment-layout drawings created in the virtual-screen buffers 18 are stored in the physical-characteristic file 24. In addition to the created equipment layers, a layer in the physical-screen buffer 19 which layer is created by superimposing layers on each other is also stored. When a plurality of floors are manipulated by using the multi-window function, the same processing to store layers is carried out for each window.

The flow then continues to a step 41m to examine whether or not the current operation has been completed. If not completed, the flow returns to the step 41f to carry out a layout operation for another piece of equipment.

If completed, on the other hand, the flow proceeds to a step 41n to create or update an apparatus attribute values table and an environment attribute values table and then store them in the physical-characteristic file 24.

Figure 8:
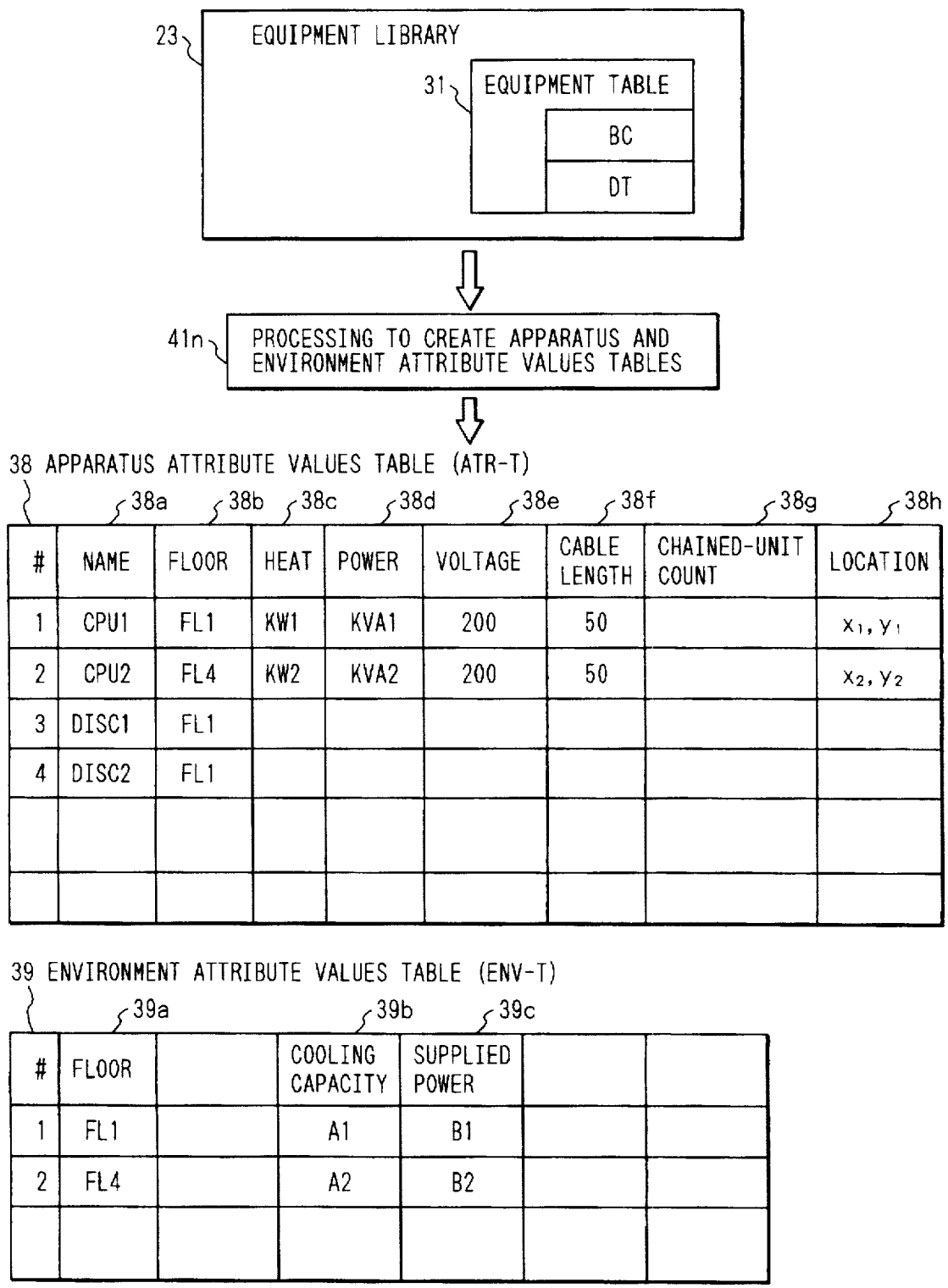
FIG. 8 is a drawing showing an outline of a process for creating an apparatus attribute values table and an environment attribute values table.

FIG. 8 shows diagrammatically an outline of the processing carried out at the step 41n.

The apparatus attribute values table (ATR-T) 38 is created from the contents of a name field, the basic-characteristic field (BC) 32 and the data field (DT) 34 of the equipment table 31 shown in FIG. 5. The contents of the environment attribute values table (ENV-T) 39 are also obtained from the equipment-library file 23.

In this embodiment, air-conditioners and distribution boards are each treated as a piece of equipment. In the case of partial modification of an installed system, data of old versions stored in these tables is read out from the physical-characteristic file 24 and updated.

The apparatus attribute values table 38 includes an equipment name 38a, a floor name 38b, an amount of dissipated heat 38c, an amount of consumed electric power 38d, a power-supply voltage 38e, an allowable cable length 38f, the allowable number of daisy-chained units 38g and equipment-location coordinates 38h.

The environment attribute values table 39, on the other hand, includes a floor name 39a, a cooling capacity 39b and a power-supply capacity 39c. The floor name 38b of the apparatus attribute values table 38 is the same as the floor name 39a of the environment attribute values table 39. The floor names 38b and 39a are used as a keyword in the inspection of the power-supply capacities and the cooling capacity to be carried out later.

As the processing at the step 41n is completed, the flow proceeds to a step 41p to examine whether or not the created layers have already been stored in the physical-characteristic file 24. If not stored yet, the flow continues to a step 41q to store the layers in the physical-characteristic file 24 before completing the processing of the SET-DEV command.

(2) CHK-AC Command 12b

After the layout of pieces of equipment on each floor has been determined to a certain degree, this command is issued to find out whether or not the amount of heat dissipated by the equipment exceeds the cooling capacity of the air-conditioner for each floor.

Figure 9:
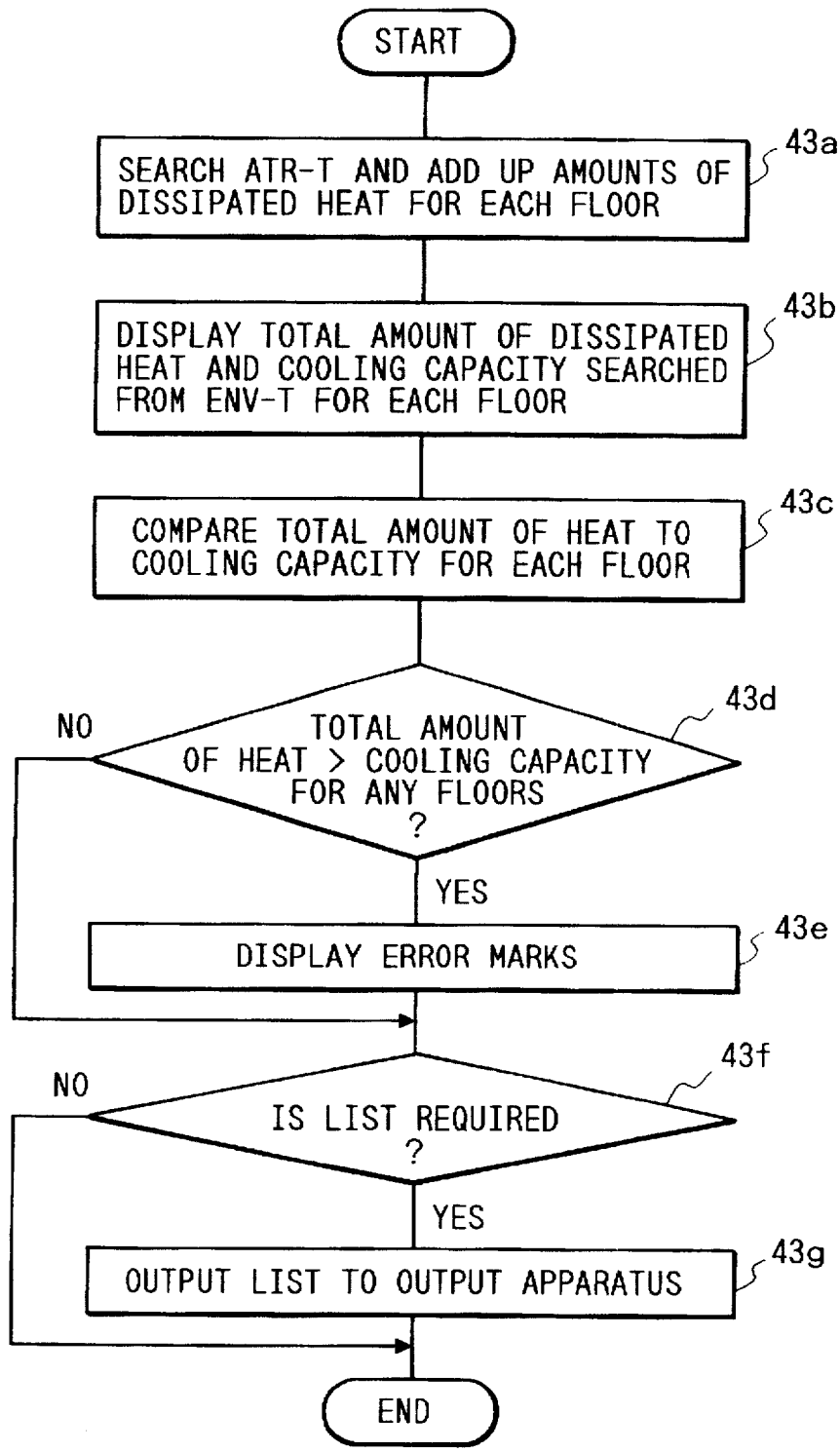
FIG. 9 shows a flowchart of the processing of the CHK-AC command.

FIG. 9 shows the processing flow of the CHK-AC command.

First of all, at a step 43a shown in the figure, the apparatus attribute values table 38 is searched in order to calculate the total amount of dissipated heat 38c at each floor. To put it in more detail, the amounts of dissipated heat of pieces of equipment in the apparatus attribute values table 38 having the same floor name 38a are added up.

At the next step 43b, the environment attribute values table 39 is searched for items having the same floor name 39a as the floor name used as a keyword at the step 43a. The cooling capacities 39b of the floors 39a having the same name as the keyword used at the step 43a are read out to be added up into a total cooling capacity of the floor. The total cooling capacity and the total amount of dissipated hear for each floor are put on a line of a table to be displayed on the display unit 20a.

The flow then proceeds to a step 43c to compare the total amount of dissipated heat with the total cooling capacity for each floor before continuing to a step 43d to determine whether or not a floor with the total amount of dissipated heat exceeding the total cooling capacity exists. If such a floor exists, the flow proceeds to a step 43e to append an error mark to the line of the floor in question in the table displayed at the step 43b.

FIG. 10 is a typical table displayed at the step 43b and an appended error mark indicated by an asterisk 45a.

The flow then proceeds to a step 43f to determine whether or not a request for a list of information obtained at the previous steps exists. If such a request exists, the flow proceeds to a step 43g to request a printing apparatus 27 to output a hard copy of the displayed table such as the one shown in FIG. 10.

(3) CHK-PWR Command 12c

This command is used for checking whether or not the amounts of electrical power consumed by the installed equipment exceed the capacities of the power supplies for each floor. The processing procedure of this command resembles that of the CHK-AC command except that the field for the amount of consumed electrical power 38d is used in place of the field for the amount of dissipated heat 38c in the apparatus attribute values table 38. As for the environment attribute values table 39, the field for the capacities of the power supplies 39c is used in place of the field for the cooling capacity 39b.

FIG. 11 shows typical information resulting from the execution of this command.

An asterisk 46a indicates that the amount of consumed electrical power exceeds the capacities of the power supplies on the floor whereas an asterisk 46b indicates a threshold piece of equipment at which an amount of consumed electrical power just exceeds the capacity of a power supply.

A piece of processing similar to the processing procedures of the CHK-AC and CHK-PWR commands can also be added to the end portion of the processing procedure of the SET-DEV command described earlier, for example, as processing following the step 41n. By so doing, the amounts of dissipating heat and consumed electrical power can be checked as is the case with the determination of the equipment layout.

(4) SET-CBL Command 12d

It is desirable to issue this command and the SET-PCBL command to be explained next after the SET-DEV, CHK-AC and CHK-PWR commands for laying out pieces of equipment, inspecting amounts of dissipated heat and amounts of consumed electrical power respectively as described earlier.

The SET-CBL command checks whether or not the connection of signal cables among laid-out pieces of equipment is proper. The term 'channel cable' used in this patent specification is a generic name for all types of signal cables.

When the execution of this command is started, an equipment layout layer and all layers composing the equipment layout layer are retrieved from the physical-characteristic file 24 along with the relevant apparatus attribute values table and the equipment layout layer is displayed on the display unit 20a.

Figure 14:
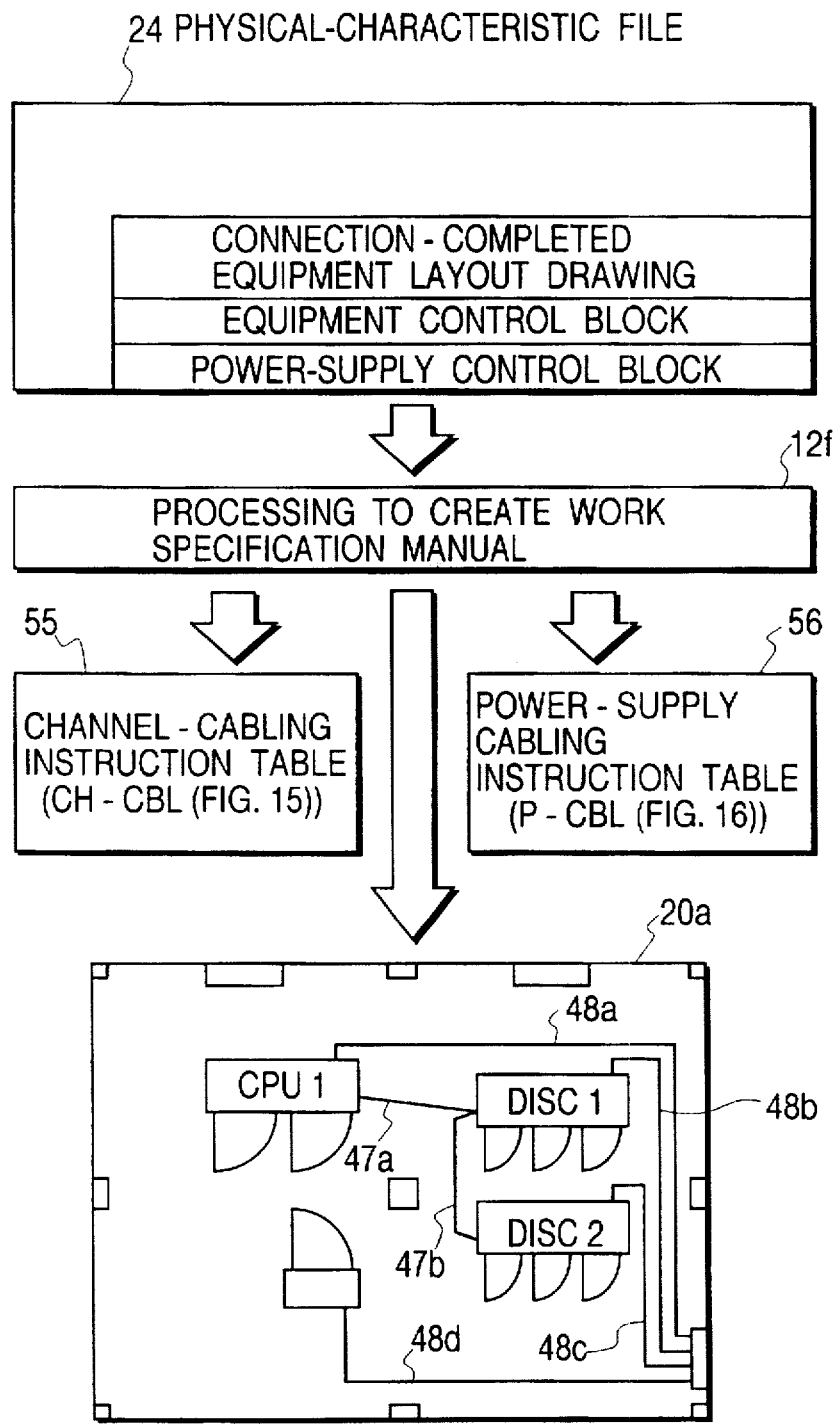
FIG. 14 shows a flowchart of the processing of the GEN-TBL command.

Connection of channel cables is specified on the display screen typically by using a mouse as exemplified by lines 47a and 47b shown in FIG. 14.

Each time a connection is specified, the total of channel-cable lengths for a connected piece of equipment is checked against an allowable cable length 38f to make sure that the former is smaller than the latter. Similarly, the number of daisy-chained units is compared to the allowable number of daisy-chained units 38g to assure that the former is smaller than the latter. Each channel-cable length is computed from data in a coordinate system in a virtual-screen buffer by tracking the connection on the display screen from a start to an end. Subsequently, the calculated channel-cable length is multiplied by a multiplying factor, a ratio of an actual length on a floor to a length in the coordinate system.

If the result of the inspection described above indicates that either condition is not met, an error indication is displayed on the display screen. Typically, the error indication is an error message.

As an alternative, the error can be indicated by blinking the display of a cable line in question. The user can then change the connection in accordance with the displayed error indication.

Figure 12:
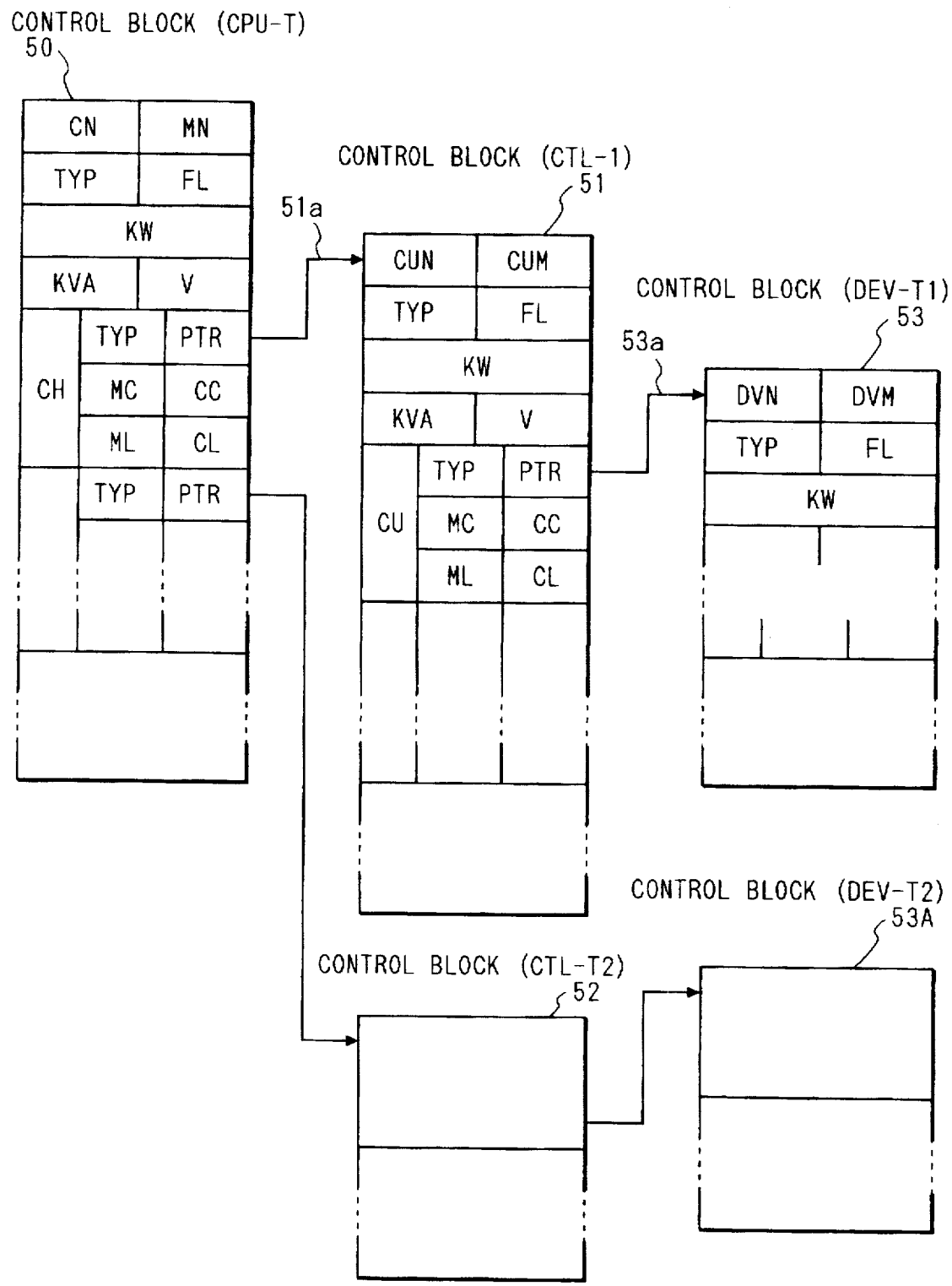
FIG. 12 is a drawing showing a set of typical equipment control blocks for pieces of equipment connected to each other by channel cables.

If both the conditions are satisfied, on the other hand, equipment control blocks 50–53, 53A shown in FIG. 12 are created from the equipment table 31 shown in FIG. 5 and the apparatus attribute value table 38 shown in FIG. 8.

A control block (CPU-T) 50 shown in FIG. 12 is associated with a CPU, whereas control blocks (CTL-T1) 51 and (CTL-T2) 52 are associated with control apparatuses connected to the CPU. A control block (DEVT1) 53 is, on the other hand, associated with equipment connected to the control apparatuses. Lines 51a and 53a represent connection specified by a pointer, corresponding to channel cables.

As an example, symbols in the control block 50 and their meanings are listed as follows:

| | |
|---|---|
| CN | The number of current entries |
| TYP | Equipment type |
| KW | The amount of dissipated heat |
| V | Required power-supply voltage |
| PTR | Pointer |
| CC | The number of current daisy-chained units |
| CL | Current cable length |
| MN | The maximum number of entries |
| FL | Installation floor |
| KVA | Consumed power |
| CH | Channel |
| MC | The maximum number of daisy-chained units |
| ML | Maximum cable length |

As connection of all required channel cables is completed, the various created control blocks and the equipment layout drawing with its wiring done are stored in the physical-characteristic file 24.

(5) SET-PCBL Command 12e

This command is issued to carry out the same processing as the SET-CBL command described earlier for connection of power-supply cables. A power-supply control block (BK-T) 54 shown in FIG. 13 is created and stored in the physical-characteristic file 24 along with the equipment layout drawing for which connection has been completed.

Connection of power-supply cables is specified on the display screen as exemplified by lines 48a to 48d shown in FIG. 14. The actual length of a power-supply cable is computed in the same way as a channel cable. The power-supply control block 54 includes a breaker name, connected equipment names, the power-supply voltage, the breaker breaking current and the power-supply cable length for each power-supply cable.

(6) GEN-TBL Command 12f

This command is used for creating a manual describing cabling work instructions which comprise a channel cabling instruction table, a power-supply cabling instruction table and connection-completed equipment layout table.

FIG. 14 diagrammatically shows an outline of the processing of the GEN-TBL command. the execution of this command, the equipment control blocks, the power-supply control block and the connection-completed equipment layout drawing shown in FIGS. 12 and 13 are retrieved from the physical-characteristic file 24. The connection-completed equipment layout drawing is then stored in the virtual-screen buffers 18.

Subsequently, the equipment control block and the power-supply control block are searched one after another to fetch cabling information which is used for creating a channel cabling instruction table (CH-CBL) 55 and a power-supply cabling instruction table (P-CBL) 56.

The connection-completed equipment layout drawing is displayed on the display unit 20a. Lines 47a and 47b are examples of channel cables whereas lines 48a to 48d are examples of power-supply cables. The channel cabling instruction table (CH-CBL) 55, the power-supply cabling instruction table (P-CBL) 56 and the connection-completed equipment layout drawing are stored in the logical-characteristic file 25. In addition, their hard copies are also output to the printing apparatus 27 as well.

Details of the channel cabling instruction table (CH-TBL) 55 are shown in FIG. 15. A NAME field 55a shows the name of equipment whereas a SLOT field 55b shows the number of a channel. FROM and TO fields 55c and 55d show the start and end of a cable respectively. A LENGTH field 55e shows a cable length whereas a TYPE field 55f shows the type of a cable such as a metal cable, an optical cable or others.

Details of the power-supply cabling instruction table (CH-TBL) 56 are shown in FIG. 16. A NAME field 56a shows the name of equipment whereas a BREAKER field 56b shows the name of a breaker. V and A fields 56c and 56d show a voltage and a breaker breaking current respectively. A TO field 56e shows the name of connected equipment whereas a LENGTH field 56f shows the length of a power-supply cable.

By referring to the channel cabling instruction table (CH-TBL) 55, the power-supply cabling instruction table (P-CBL) 56 and the connection-completed equipment layout drawing, the workers can smoothly execute the cabling work at a variety of stages, from the receiving of equipment to the installation of cables.

(7) GEN-CNF Command 12g

This command is used for creating a logical configuration drawing showing logical relation and connection among pieces of equipment composing a computer system and configuration defining parameters required by an OS running on the computer system.

Figure 17:
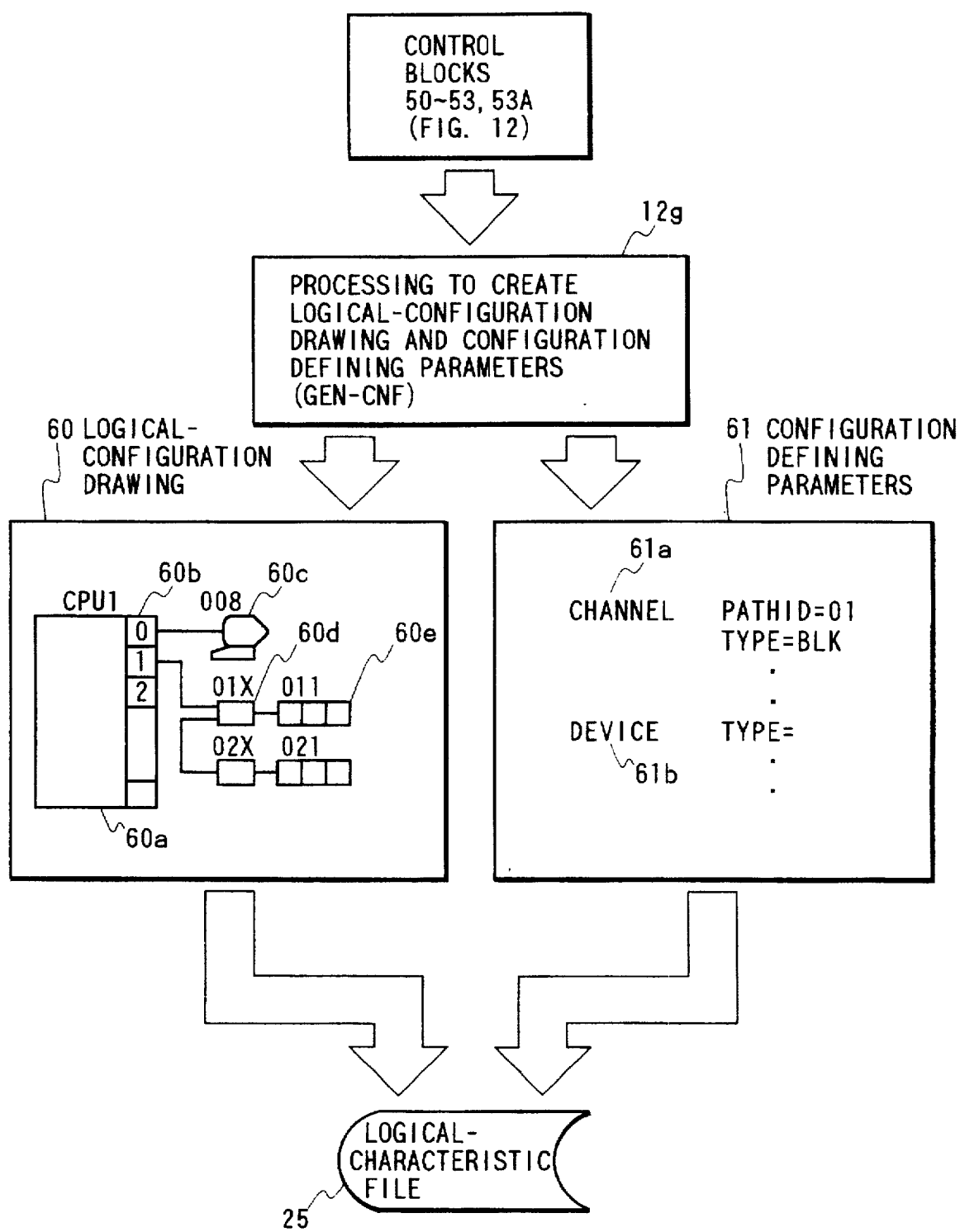
FIG. 17 shows a flowchart of the processing of the GEN-CNF command.

FIG. 17 diagrammatically shows an outline of the processing of the GEN-CNF command.

First of all, equipment control blocks 50–53, 53A as shown in FIG. 12 are retrieved from the physical-characteristic file 24. Subsequently, search operations are carried out starting with the CPU control block 50 before continuing to the control blocks 51 to 53, 53A one after another. Each time a control block is encountered, types of equipment described therein are fetched and associated FIGS. 60a, 60c, 60d etc. determined in advance are arranged in a virtual-screen buffer VBn. In addition, connection lines among the pieces of equipment are drawn to create a logical-configuration drawing 60.

Configuration defining parameters 61 are created at the same time as the processing described above by generating strings of characters for defining the configuration of each piece of equipment. For example, character strings 61a and 61b are generated for the channel 60b and the equipment 60e respectively.

The logical-configuration drawing 60 and the configuration defining parameters 61 created in this way are stored in the logical-characteristic file 25. If necessary and, in particular, if the configuration-management aiding apparatus 100 has not been connected to the computer system. the configuration defining parameters 61 are further output to a floppy disc through the floppy-disc drive 26. Furthermore, the logical-configuration drawing 60 and the configuration defining parameters 61 can be displayed in the display unit 20a or their hard copies can also be produced by the printing apparatus 27.

(8) EDT Command 12h

This command is prepared for partially correcting the configuration defining parameters.

For example, when the system-generation processing program 8 of the computer system 1 runs in accordance with the configuration defining parameters created by the configuration-management aiding apparatus 100, generating an error, in many cases, the error can probably be eliminated by slightly correcting the configuration defining parameters.

Similarly, when very few pieces of equipment of an already installed computer system are to be modified, the configuration defining parameters need to be corrected slightly. In this case, it will be terribly troublesome to redesign the equipment layout by using the SET-DEV command and others described so far. In such a case, the EDT command is useful instead.

The user specifies a file name of the configuration defining parameters by operating the terminal unit 20 and enters the EDT command. For the sake of explanation clarity, refer to FIG. 1. In response to this command, a specified configuration defining parameter is read out from the logical-characteristic file 25 into one of the virtual-screen buffers (VB0 to VBn) and then output to the display unit 20a through the real-screen buffer 19. The desired configuration defining parameter is corrected on the screen. The corrected configuration parameter is finally stored in the logical-characteristic file 25 and, if necessary, stored in a floppy disc. (9) TRS Command 12i This command is used for transferring configuration defining parameters stored in the logical-characteristic file 25 to the computer system 1. When this command is entered via the terminal unit 20 along with the file name of the configuration defining parameters, the configuration defining parameters of the specified file name are read out from the logical-characteristic file 25 to a virtual-screen buffer VBn and then transferred to the configuration-information file 6 of the computer system 1 through the transmission/reception process 13 and the cable L2. The transfer of the configuration defining parameters allows the system-generation processing program 8 to immediately carry out the system-generation processing in accordance with the configuration defining parameters stored in the configuration-information file 6.

The system-generation processing program 8 of the computer system 1 can be invoked directly from the terminal unit 20 of the configuration-management aiding apparatus.

That is to say, the configuration-management aiding apparatus 100 functions also as a console or a terminal unit of the computer system 1. A message from the computer system 1 is received by the configuration-management aiding apparatus 100 through the cable L1. Similarly, a command entered by the operator via the configuration-management aiding apparatus 100 is transmitted to the computer system 1 also through the cable L1.

To put it in more detail, a message from the computer system 1 travels through a communication path starting at the cable L1, followed by the transmission/reception process 13 and the virtual-screen buffer 18 and ending at the real-screen buffer 19 before being displayed in the display unit 20a of the terminal unit 20. A command entered by the operator to the terminal unit 20 is, on the other hand, passed on to the computer system 1 through a communication path in the reversed order to that of a message: the real-screen buffer 19, then to the virtual-screen buffer 18, then to the transmission/reception process 13 and finally to the cable L1 before arriving at the computer system 1.

The fact that the computer system 1 and the configuration-management aiding apparatus 100 share the terminal unit 20 is one of the features offered by the present invention.

This feature allows a sequence of operations listed below to be carried out in the system shown in FIG. 1 by using the terminal unit 20 only even after the transmission of configuration defining parameters to the computer system 1 has been completed.

(a) The terminal unit 20 functions as a console of the computer system 1, allowing the user to perform system generation by invoking the system-generation processing program 8 therefrom.

(b) When the system-generation processing program 8 detects an error in configuration defining parameters, an error message is displayed in the display unit 20a of the terminal unit 20.

(c) The terminal unit 20 functions as a console of the computer system 1, allowing the user to correct configuration defining parameters stored in the logical-characteristic file 25 by entering an EDT command thereto.

(d) A TRS command can be used to transmit configuration defining parameters from the logical-characteristic file 25 in the terminal unit 20 to the configuration-information file 6 of the computer system 1.

(e) The terminal unit 20 functions as a console of the computer system 1, allowing the user to invoke the system-generation processing program 8 therefrom.

The connection between the configuration-management aiding apparatus 100 and the computer system 1 can be implemented by means of a communication line. Such an embodiment is shown in FIG. 18.

In the embodiment shown in the figure, the configuration-management aiding apparatus 100 is connected to the computer system 1 through an Ethernet LAN (Local Area Network) 65. Configuration defining parameters created in the configuration-management aiding apparatus 100 are read out from the logical-characteristic file 25 in response to a TRS command and output to the Ethernet LAN 65 with the computer system 1 taken as a destination. The OS of the computer system 1 receives the configuration defining parameters bound for the computer system 1, storing them into the configuration-information file 6.

In such a scheme, the computer system 1 has a console 66 of its own, via which console 66, the system-generation processing program is invoked.

In the case of another embodiment provided by the present invention, the configuration-management aiding apparatus 100 functions as a completely independent system. That is to say, there is no connection between the computer system 1 and the configuration-management aiding apparatus 100. In such a scheme, configuration defining parameters are supplied to the computer system 1 by means of a transportable storage medium such as a floppy disc. The configuration-management aiding apparatus 100 in this embodiment can be implemented by a still more compact personal computer.

The present invention allows a sequence of jobs comprising the design of an equipment layout, the design of various connections and the creation of configuration defining parameters in the installation of a new computer system or partial modification of the configuration of an already installed computer system to be carried out by means of a computer in a uniform manner and, at the same time, allows the appropriateness of the designs to be examined.

As a result, there is much less necessity to depend on experiences of individual system engineers in accomplishing the jobs and the number of design mistakes is reduced. On top of that, a lack of prepared manuals can be avoided, allowing the installation work to be carried out smoothly.

We claim:

1. A method of generating configuration defining parameters of a computer system for a computer center by an aiding computer before the computer system is configured, the computer system comprising pieces of equipment which include at least one processing unit and other apparatuses, said apparatuses including a plurality of input/output devices to be connected to said at least one processing unit through channels, said plurality of input/output devices including a plurality of storage devices and at least one printer, said aiding computer including a processing unit, an input device and a display unit, said method comprising steps executed by said aiding computer, the steps including:

- a first step of determining proper installation locations of said pieces of equipment by displaying a drawing of an installation area and figures of said pieces of equipment on a display screen of said display unit and through interactive operations with a user through said input device;
- a second step of inspecting appropriateness of connection by cables between said pieces of equipment, in response to specifying of said connection by the user, after installation locations of said pieces of equipment have been determined at said first step; and
- a third step of generating configuration defining parameters of said computer system, based on said connection by cables, after said connection by cables has been inspected as being appropriate at said second step, said configuration defining parameters for said computer system including information which is related to said apparatuses included in said computer system and is required by a system generation program within an operating system controlling said computer system, said system generation program being one which executes system generation processing for enabling said operating system to use said apparatuses included in said computer system, based upon said generated configuration defining parameters for said computer system, when said system generation program is executed on said one processing unit within said computer system after said computer system has been configured.

2. A method according to claim 1, wherein said first step includes the sub-steps of:
- displaying a drawing of a first installation area on a first display area of said displaying screen;
- displaying a first group of figures of a first group of user-specified pieces of equipment at user-specified locations on said displayed drawing of said first installation area; and
- inspecting to determine whether or not one of said displayed first group of figures overlaps another of said displayed first group of figures.

3. A method according to claim 2, wherein each of said figures of said pieces of equipment includes a space for opening and closing a maintenance door included in one of said pieces of equipment which said each figure represents, wherein said inspecting step inspects whether one of said displayed first group of figures is spaced from another of said displayed first group of figures at least by amount required for opening of the maintenance door of each of said one displayed figure and said another displayed figure.

4. A method according to claim 2, wherein said first step further includes a sub-step of moving one of said first group of displayed figures corresponding to a user-specified one of said first group of pieces of equipment to a user-specified location on said first installation area, before said inspecting is carried out.

5. A method according to claim 2, wherein said first step further includes:
- displaying a drawing of a second installation area on said display screen;
- displaying a second group of figures of a user-specified second group of pieces of equipment on said second installation area;
- moving one of said first group of figures corresponding to a user-specified one of said first group of pieces of equipment, to a user-specified location on said second installation area; and
- inspecting to determine whether or not said one moved displayed figure overlaps one of said displayed second group of figures.

6. A method according to claim 5, wherein said first and second display areas are manipulated by means of a multi-window function.

7. A method according to claim 2, wherein said first step, further includes a sub-step of displaying a relevant instruction on said display screen, when an overlap of one of said first group of figures on another thereof has been detected at said inspecting step.

8. A method according to claim 2, wherein at said first step further includes the sub-steps of:
- creating a drawing of said first installation area in a first virtual-screen buffer;
- creating said first group of figures of said first group of pieces of equipment in a second virtual-screen buffer; and
- superimposing contents of said first and second virtual-screen buffers on each other in a real-screen buffer; and
- displaying contents of said real-screen buffer on said display screen.

9. A method according to claim 1, wherein said first step further includes the sub-steps of:
- creating an apparatus attribute values table including characteristics of said pieces of equipment from data stored in an equipment library file after installation locations of said pieces of equipment have been determined;
- creating an environment attribute values table including characteristics of said installation areas; and
- storing in a file, said tables and information representing a drawing of said installation area after said determining of installation locations of said pieces of equipment.

10. A method according to claim 9;
wherein said apparatus attribute values table includes names, amounts of dissipated heat, amounts of consumed electrical power, allowable cable lengths, the allowable of daisy-chained units and location coordinate values of said pieces of equipment;
whereas said environment attribute values table includes capacities of cooling equipment and capacities of power supplies.

11. A method according to claim 1, further comprising a step of:
- comparing total amount of heat dissipated by said pieces of equipment to a cooling capacity of said installation area, and displaying corresponding warning message in said display screen, if said total amount of said dissipated heat exceeds said cooling capacity.

12. A method according to claim 11, wherein said comparing step is executed after completion of said first step, in response to a request made by the user.

13. A method according to claim 11, wherein said comparing step is executed without waiting for a request made by the user.

14. A method according to claim 1 further comprising the steps of:
- comparing total amount of electrical power consumed by said pieces of equipment to capacities of power supplies for said installation area, and displaying a corresponding warning message in said display screen, if said total amount of consumed electrical power exceed said capacities.

15. A method according to claim 14, wherein said comparing step is executed after completion of said first step, in response to a request made by the user.

16. A method according to claim 14, wherein said comparing step is executed without waiting for a request made by the user.

17. A method according to claim 1, wherein said second step comprises the sub-steps of:

displaying connection of channel cables which connect figures of user-specified ones of said pieces of equipment displayed on said displayed drawing of said installation area; and inspecting appropriateness of said connection of channel cables.

18. A method according to claim 17, wherein said sub-step of inspecting appropriateness of said connection of channel cables includes inspecting a number of daisy-chains of each of said pieces of equipment exceeds a maximum number of daisy-chains chains allowable for said each piece of equipment.

19. A method according to claim 17, wherein said sub-step of inspecting appropriateness of said connection of channel cables includes inspecting whether a sum of lengths of cables connected to each piece of equipment exceeds a maximum cable length allowable for said piece of equipment.

20. A method according to claim 17, wherein said second step further includes a sub-step of displaying a warning message in said display unit when inappropriateness is found in said connection of channel-cable.

21. A method according to claim 17, wherein said second step further includes the sub-steps of: creating equipment-characteristic tables each for one of pieces of equipment connected to another by said connection of channel cable, one of said tables for said one piece of equipment including a pointer denoting connection of said one piece of equipment to said another piece of equipment; and storing in a file said equipment-characteristic tables and information representing a drawing of an installation area including said pieces of equipment connected to another by said connection of channel cables.

22. A method according to claim 1, wherein said second step further includes a sub-step of displaying connection of power-supply cables to a user specified one of said pieces of equipment displayed on said displayed drawing of said installation area.

23. A method according to claim 1, wherein said second step comprises the sub-steps of:

displaying in said displaying screen, a drawing of said installation area and figures pieces of equipment with their installation locations already determined in said first step; and displaying connection of power-supply cables to a user-specified one of said pieces of equipment on said displayed drawing.

24. A method according to claim 23, wherein said sub-step of displaying power-supply connection includes:

selecting a breaker in a distribution board that satisfies power-supply requirement set for said user-specified piece of equipment; and drawing a power-supply cable from said selected breaker to said user-specified piece of equipment.

25. A method according to claim 23, wherein said second step further includes the sub-steps of:

creating power-supply characteristic tables each for one of said power-supply cables, one of said tables for one of said power-supply cables including characteristics of a power-supply relevant to said one power-supply cable and the length of said one power-supply cable; and storing in a file said power-supply characteristic tables and information representing a drawing of an installation area including pieces of equipment connected to said power-supply cables.

26. A method according to claim 1, further comprising a step of creating a work specification manual for use in carrying out installation work based on information obtained from said first and second steps.

27. A method according to claim 26, wherein said work specification manual comprises a layout drawing of pieces of equipment connected by channel cables and power-supply cables, a channel-cabling instruction table and a power-supply-cabling instruction table.

28. A method according to claim 1, wherein said third step comprises a sub-step of creating a logical-configuration drawing illustrating logical connection among said pieces of equipment, based on characteristics of said pieces of equipment with their installation location determined at said first step and based on connection of cables which has passed said inspecting of appropriateness executed at said second step.

29. A method according to claim 1, wherein said aiding computer is connected to said computer system by a data transfer path, wherein said method further comprises the steps of:

transferring said generated configuration defining parameters to said computer system to be stored therein by way of said data transfer path; and accessing by said aiding computer, said configuration defining parameters transferred to and stored in said computer system.

30. A method according to claim 1, wherein said data transfer path includes a local area network, wherein said transferring step and said accessing steps are executed by using said local area network.

31. A compound computer comprising:

a first computer for a computer center including pieces of equipment which includes at least one processing unit and other apparatuses, said apparatuses including a plurality of input/output devices connected to said at least one processing unit through channels, said plurality of input/output devices including a plurality of storage devices and at least one printer;

a second computer for executing determination of a layout of said pieces of equipment, determination of connection by cables between said pieces of equipment and creation of configuration defining parameters for said pieces of equipment, based upon said layout and said connection after said connection have been determined, wherein said parameters are ones to be used by an operating system which controls said first computer, wherein at least one terminal unit is connected to said second computer; and connection means for transferring said configuration defining parameters created by said second computer to said first computer.

32. A compound computer according to claim 31, wherein said connection means comprises a Local Area Network.

33. A compound computer according to claim 31, wherein said connection means includes means for transmitting a command for invoking a system-generation program from said terminal unit to said first computer.

34. A compound computer according to claim 33, wherein said terminal unit includes:

means for inputting commands required for control of operations of said first computer; and means for displaying messages given by said first computer, wherein said connection means includes means for transferring said commands from said terminal unit to said first computer and for transferring said messages from said first computer to said terminal unit;

thereby allowing said second computer to function as a console of said first computer.

35. A compound computer according to claim 31, further comprising access means for accessing said configuration defining parameters transferred to and held by said second computer.

36. A system generation method of a computer system for a computer center by use of an aiding computer, said computer system including pieces of equipment including at least one processing unit and other apparatuses, said apparatuses including a plurality of input/output devices connected to said at least one processing unit through channels, said plurality of input/output devices including a plurality of storage devices and at least one printer, said aiding computer including at least one processing unit, an input device and a display unit, said method comprising steps executed for system regeneration after system reconfiguration of said computer system, said system reconfiguration of said computer system including one of addition of at least one piece of equipment to pieces of equipment before the system reconfiguration, removal of at least one piece of equipment form those pieces of equipment before the system reconfiguration and change of connection of at least one equipment with other pieces of equipment before the system reconfiguration, said steps including:

a first step of determining by said aiding computer before tho system reconfiguration of said computer system, proper installation locations of pieces of equipment to be used after the system reconfiguration of said computer system, by displaying a drawing of an installation area and figures of said pieces of equipment on a display screen of said display unit and through interactive operations with a user through said input device, said displaying step including displaying figures of pieces of equipment included in said computer system before the system reconfiguration and modifying said displayed figures so that figures of said pieces of equipment to be used after the system reconfiguration of said computer system are displayed through interactive operations with said user through said input device;

a second step of inspecting by said aiding computer before the system reconfiguration of said computer system, appropriateness of connection by cables among said pieces of equipment to be used after the system reconfiguration of said computer system, in response to specifying of said connection by said user, after installation locations of said pieces of equipment to be used after the system reconfiguration of said computer system has been determined at said first step;

a third step of generating by said aiding computer, configuration defining parameters for said computer system, said generating step being executed based on said connection, after said connection has been inspected as being appropriate at said second step, said configuration defining parameters for said computer system including information which is related to said apparatuses included in said computer system and is required by a system generation program within an operating system controlling said computer system;

transferring said generated configuration defining parameters from said aiding computer to said computer system; and executing system generation processing by said system generation program, based upon said transferred configuration defining parameters for said computer system, after the system reconfiguration has been executed to said computer system, said system generation processing being one for enabling said operating system to use said apparatuses included in said computer system.

37. A method according to claim 36, wherein said computer system is connected to said aiding computer by way of a signal transfer path;

said method further comprising a step of transferring by said aiding computer, said generated configuration defining parameters to said computer system by way of said signal transfer path.

38. A method according to claim 37, wherein said pieces of equipment of said computer system before system reconfiguration includes a storage device connected to said aiding computer and accessible by said aiding computer by way of said signal transfer path:

said method further comprising a step of transferring said generated configuration defining parameters from said aiding computer said storage device in said computer system by way of said signal transfer path.

39. A method according to claim 38, further comprising a step of invoking said system-generation program of said computer system from said input device of said aiding computer, so that said computer system executes system generation based upon said configuration defining parameters stored in said storage device, said invoking being executed after said transferring of said configuration defining parameters to said storage device and after said storage computer system has been reconfigured with respect to pieces of equipment included therein.

40. A method according to claim 39, further comprising a step of correcting some of said configuration defining parameters stored in said storage device from said input device of said aiding computer.

41. A method according to claim 40, further comprising a step of invoking a system generation program included in said operating system controlling said computer system, from said input device of said aiding computer by way of said signal transfer path, so that said system regeneration is executed by said system generation program based upon said transferred configuration defining parameters.

42. A method according to claim 40, further comprising steps of:

storing by said computer system, said transferred configuration defining parameters within said computer system; and modifying said stored configuration defining parameters by user operations through said input device by way of said signal transfer path.

43. A method according to claim 42, wherein said modifying step comprises steps of:

storing by said aiding computer, said generated configuration defining parameters in a storage device provided within said aiding computer;

modifying by said aiding computer, said configuration defining parameters stored in said storage device provided within said aiding computer by user operations through said input device;

transferring by said aiding computer, said modified configuration defining parameters to said computer system by way of said signal transfer path; and rewriting by said computer system, said configuration defining parameters transferred and stored in said computer system by said transferred modified configuration defining parameters.

44. A method according to claim 39, wherein said aiding computer further includes a first storage device for recording data in and reading data from a removable storage medium, and said computer system further includes a second storage device for recording data in and reading data from a removable storage medium;

wherein said transferring step comprises the steps of:

storing by said aiding computer, said generated configuration defining parameters in a removable recording medium by said first storage device provided within said aiding computer; and reading by said computer system, said generated configuration defining parameters stored in said removable recording medium by said second storage device provided within said computer system.

* * * * *